(12) United States Patent
Tsuk et al.

(10) Patent No.: US 10,097,239 B1
(45) Date of Patent: Oct. 9, 2018

(54) PROCESSOR-IMPLEMENTED SYSTEMS AND METHODS FOR MULTI-CONDUCTOR TRANSMISSION LINE SIMULATION

(71) Applicant: Ansys, Inc., Canonsburg, PA (US)

(72) Inventors: Michael J. Tsuk, Arlington, MA (US); Jacob K. White, Belmont, MA (US); J. Eric Bracken, Harrison City, PA (US)

(73) Assignee: Ansys, Inc., Canonsburg, PA (US)

( * ) Notice: Subject to any disclaimer, the term of this patent is extended or adjusted under 35 U.S.C. 154(b) by 16 days.

(21) Appl. No.: 15/244,552

(22) Filed: Aug. 23, 2016

Related U.S. Application Data

(60) Provisional application No. 62/209,441, filed on Aug. 25, 2015.

(51) Int. Cl.
| | | |
|---|---|---|
| *H04B 3/00* | (2006.01) | |
| *H04L 25/00* | (2006.01) | |
| *H04B 3/50* | (2006.01) | |
| *H04B 3/40* | (2006.01) | |

(52) U.S. Cl.
CPC ............... *H04B 3/50* (2013.01); *H04B 3/40* (2013.01)

(58) Field of Classification Search
CPC ......................................................... H04B 3/54
See application file for complete search history.

(56) References Cited

U.S. PATENT DOCUMENTS

| | | | |
|---|---|---|---|
| 8,386,216 B1* | 2/2013 | Al-Hawari | G06F 17/5036 703/2 |
| 2005/0160382 A1* | 7/2005 | Wang | G06F 17/5036 716/115 |
| 2015/0233976 A1* | 8/2015 | Johannesson | G01R 15/18 324/764.01 |

* cited by examiner

*Primary Examiner* — Chieh M Fan
*Assistant Examiner* — Gina McKie
(74) *Attorney, Agent, or Firm* — Jones Day

(57) ABSTRACT

Systems and methods are provided for constructing a physical transmission line system. Characteristic data associated with a transmission line system is received. A model of the transmission line system is built based on the characteristic data. Building a model of the transmission line system includes determining a characteristic admittance matrix based on the characteristic data, determining a propagation function matrix based on the characteristic data, calculating a linking matrix based on the characteristic admittance matrix and the propagation function matrix, and determining a state space model based on the characteristic admittance matrix and the linking matrix. A simulation is performed using the state space model to determine a physical characteristic, where the transmission line system is built or modified based on the simulation-determined physical characteristic.

20 Claims, 7 Drawing Sheets

US 10,097,239 B1

PROCESSOR-IMPLEMENTED SYSTEMS AND METHODS FOR MULTI-CONDUCTOR TRANSMISSION LINE SIMULATION

CROSS-REFERENCE TO RELATED APPLICATIONS

This application claims priority to U.S. Provisional Application No. 62/209,441, filed Aug. 25, 2015, the entirety of which is herein incorporated by reference.

BACKGROUND

Transmission line simulation (e.g., cross-talk and signal propagation/reflection simulation) has traditionally been a simulation topic of some neglect. Traditionally, large transmission lines (e.g., coaxial cable transmission lines into televisions) functioned almost as perfect conductors, having few material reflections that could result in noticeable signal degradations. As devices become significantly smaller (e.g., mobile computing devices, mobile phones, portable fitness devices), the transmission lines therein (e.g., printed circuit board and other semiconductor traces) become smaller and smaller in cross sectional size, increasing their electrical resistance. These engineering complexities demand accurate simulation capabilities.

SUMMARY

Systems and methods are provided for constructing a physical transmission line system (e.g., through simulation processes that eliminate errors in steady-state simulated responses of transmission lines). Characteristic data associated with a transmission line system is received. A model of the transmission line system is built based on the characteristic data. Building a model of the transmission line system includes determining a characteristic admittance matrix based on the characteristic data, determining a propagation function matrix based on the characteristic data, calculating a linking matrix based on the characteristic admittance matrix and the propagation function matrix, and determining a state space model based on the characteristic admittance matrix and the linking matrix. A simulation is performed using the state space model to determine a physical characteristic, where the transmission line system is built or modified based on the simulation-determined physical characteristic.

As another example, a computer-implemented system for constructing a physical transmission line system includes one or more data processors and a computer-readable medium encoded with instructions for commanding one or more data processors to execute steps of a method. In the method, characteristic data associated with a transmission line system is received. A model of the transmission line system is built based on the characteristic data. Building a model of the transmission line system includes determining a characteristic admittance matrix based on the characteristic data, determining a propagation function matrix based on the characteristic data, calculating a linking matrix based on the characteristic admittance matrix and the propagation function matrix, and determining a state space model based on the characteristic admittance matrix and the linking matrix. A simulation is performed using the state space model to determine a physical characteristic, where the transmission line system is built or modified based on the simulation-determined physical characteristic.

As a further example, a computer-readable medium encoded with instructions for commanding one or more data processors to execute steps of a method for constructing a physical transmission line system. In the method, characteristic data associated with a transmission line system is received. A model of the transmission line system is built based on the characteristic data. Building a model of the transmission line system includes determining a characteristic admittance matrix based on the characteristic data, determining a propagation function matrix based on the characteristic data, calculating a linking matrix based on the characteristic admittance matrix and the propagation function matrix, and determining a state space model based on the characteristic admittance matrix and the linking matrix. A simulation is performed using the state space model to determine a physical characteristic, where the transmission line system is built or modified based on the simulation-determined physical characteristic.

DETAILED DESCRIPTION

Systems and methods as described herein provide a transmission line simulation engine that, in one embodiment, include a link between a characteristic admittance matrix and a propagation function matrix in the generation of a state space model that forces the model to an appropriate steady state configuration, where separate modeling of characteristic admittance and propagation function can result in erroneous steady state behaviors. In one example, implementation of a lossy transmission line in a transient simulator is described using a state space model for the frequency-dependent characteristic admittance of the line (instead of a characteristic impedance, providing accurate transient simulation).

Figure 1:
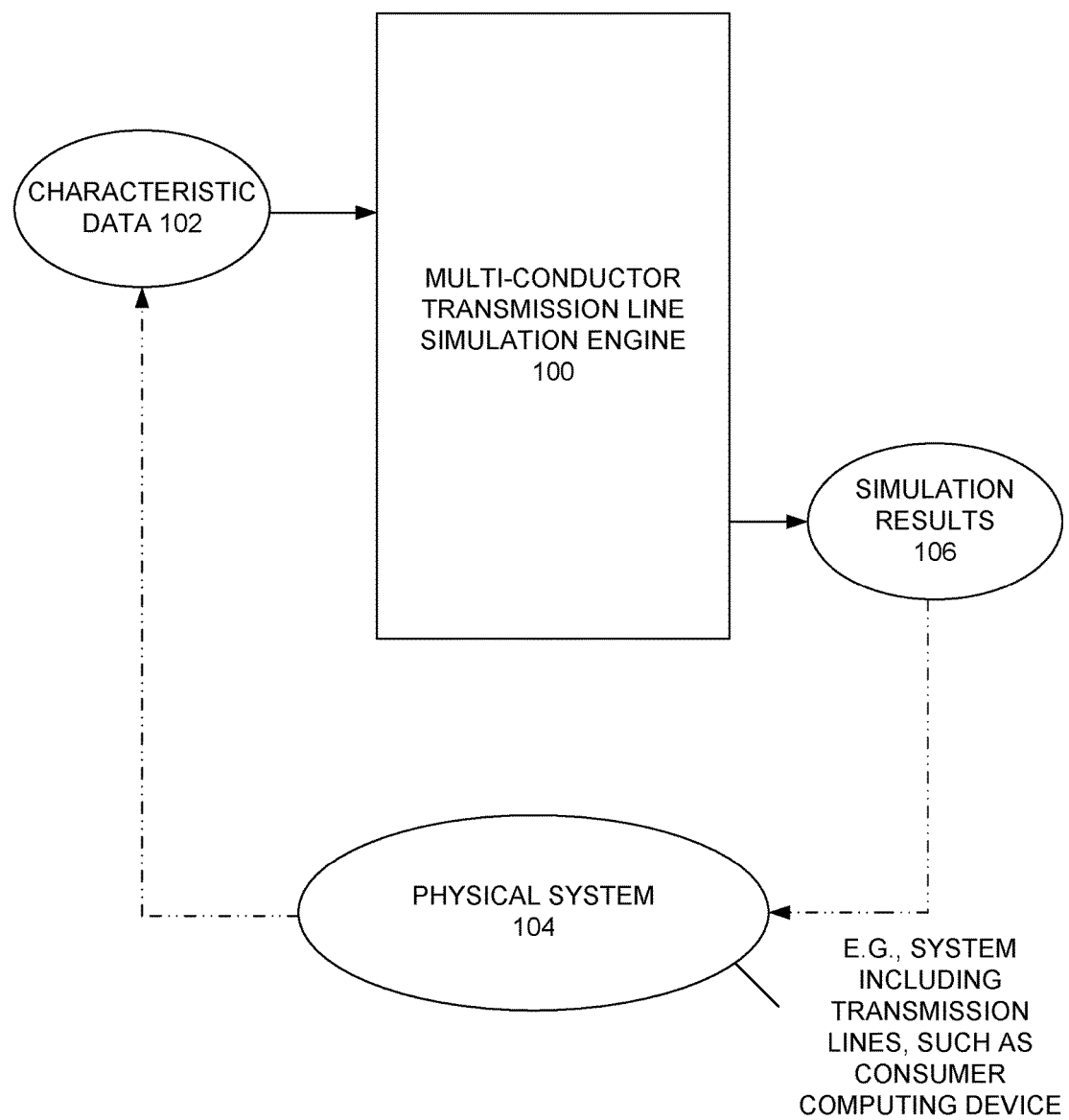
FIG. 1 is a block diagram depicting a multi-conductor transmission line simulation engine.

FIG. 1 is a block diagram depicting a multi-conductor transmission line simulation engine. A simulation engine 100 receives characteristic data 102 describing a physical system 104 that includes one or more transmission lines. The characteristic data 102 may describe a physical system 104 that already exists or a physical system 104 (e.g., a consumer computing device) that is to be built, pending simulation results. The simulation engine 100 performs a state space simulation based on the characteristic results and outputs simulation results 106 that describe a simulated physical characteristic of the physical system 104 (e.g., how that physical system 104 behaves based on injection of one or more impulse signals into the one or more transmission lines present in the physical system 104). Based on the simulation results 106, the physical system 104 can be modified (e.g., if the simulation results 106 indicate unwanted behavior) or the physical system 104 can be built (e.g., when the simulation results predict that the physical system 104 will behave as desired).

Given a system of N lossy coupled transmission lines, a set of per-unit-length circuit parameter matrices R, L, G and C are defined. These may be frequency dependent. It is convenient to also define $$Z = R + sL$$

$$Y = G + sC$$

The telegrapher equations for the transmission lines are then $$\frac{\partial v}{\partial x} + Zi = 0$$

$$\frac{\partial i}{\partial x} + Yv = 0$$

These can be combined by differentiating the second equation and inserting the first:

$$\frac{\partial^2 i}{dx^2} - YZi = 0$$

This is a set of coupled differential equations. To facilitate solving, a system can decouple using the eigenmode composition of the matrix YZ. Let the decomposition be $$(YZ)P = P\Lambda^2$$

where P is a matrix whose columns are eigenvectors and $\Lambda$ is a diagonal matrix whose entries are the principal square roots of the eigenvalues.

Define a set of modal currents $f$ related to the total currents i by $$i = Pf$$

Then:

$$\frac{\partial^2 f}{\partial x^2} - \Lambda^2 f = 0$$

Assuming known currents at x=0 and x=l, then the solution of this equation is $$f(x) = \sinh[\Lambda(l-x)]\sinh(\Lambda l)^{-1}f(0) + \sinh(\Lambda x)\sinh(\Lambda l)^{-1}f(l)$$

$f(0)$ and $f(l)$ are vectors, and the quantities multiplying them are diagonal matrices.

The total line currents can then be represented as $$i(x) = P\sinh[\Lambda(l-x)]\sinh(\Lambda l)^{-1}P^{-1}i(0) + P\sinh(\Lambda x)\sinh(\Lambda l)^{-1}P^{-1}i(l)$$

By combining this result with the second telegrapher equation, the line voltage can be represented as:

$$v(x) = -Y^{-1}\frac{\partial i}{\partial x} = -Y^{-1}\{-P\Lambda\cosh[\Lambda(l-x)]\sinh(\Lambda l)^{-1}P^{-1}i(0) + P\Lambda\cosh(\Lambda x)\sinh(\Lambda l)^{-1}P^{-1}i(l)\}$$

At the points x=0 and x=l, the above expression simplifies to $$v(0) = -Y^{-1}\{-P\Lambda\coth(\Lambda l)P^{-1}i(0) + P\Lambda\operatorname{csch}(\Lambda l)P^{-1}i(l)\}$$

$$v(l) = -Y^{-1}\{-P\Lambda\operatorname{csch}(\Lambda l)P^{-1}i(0) + P\Lambda\coth(\Lambda l)P^{-1}i(l)\}$$

It is desired to have an admittance matrix description of the coupled system of transmission lines, with the port currents in terms of the port voltages. The necessary information is almost provided, but i(l) is negated in order to get the current flowing into the transmission lines. The final admittance matrix description is $$\begin{bmatrix} v(0) \\ v(l) \end{bmatrix} = Z_{port} \begin{bmatrix} i(0) \\ -i(l) \end{bmatrix}$$

where $$Z_{port} = \begin{bmatrix} Y^{-1}P\Lambda\coth(\Lambda l)P^{-1} & -Y^{-1}P\Lambda\operatorname{csch}(\Lambda l)P^{-1} \\ -Y^{-1}P\Lambda\operatorname{csch}(\Lambda l)P^{-1} & Y^{-1}P\Lambda\coth(\Lambda l)P^{-1} \end{bmatrix}$$

Figure 2:
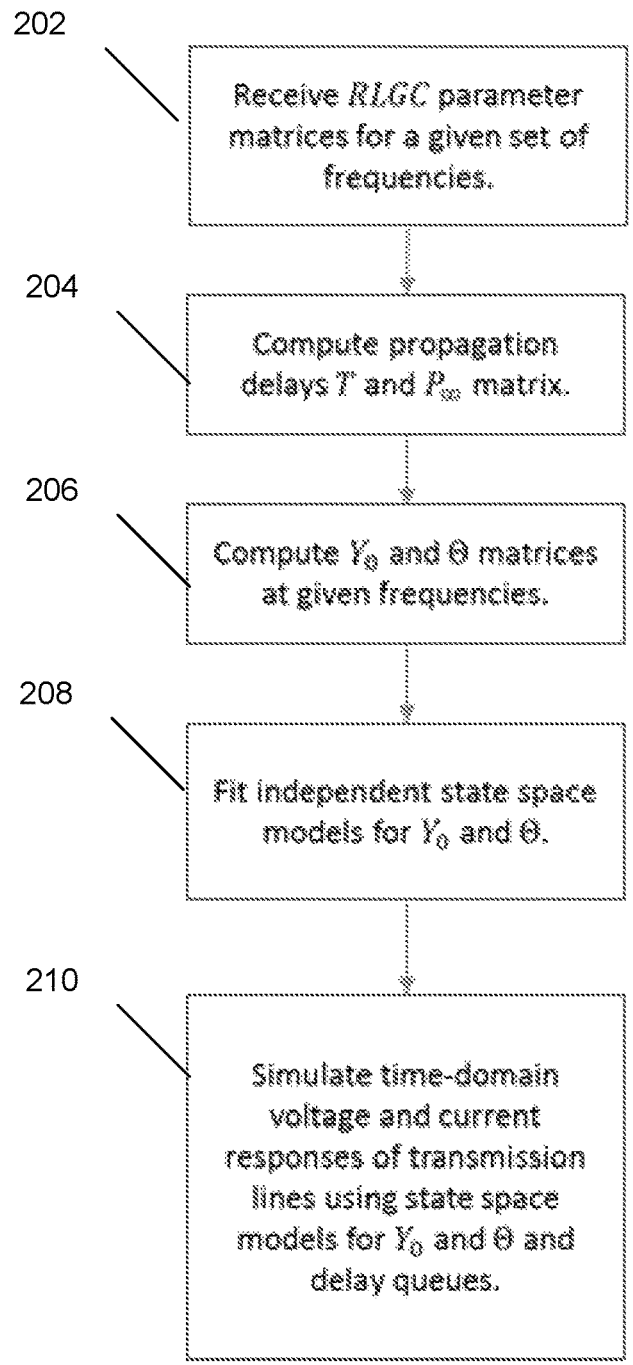
FIG. 2 is a diagram depicting a first computer-implemented process for simulating a physical transmission line system.

FIG. 2 is a diagram depicting a first computer-implemented process for simulating a physical transmission line system. The process of FIG. 2 implements a generalized method of characteristics with delay extraction. At 202, parameter matrices are received for a given set of frequencies. A diagonalized impedance is defined as is an admittance matrix, according to $$Z_D = P^T Z P$$

$$Y_D = P^{-1} Y P^{-T}$$

These are diagonal matrices. It is noted that, $$Y_D Z_D = P^{-1} Y Z P = \Lambda^2$$

Using this equality, the characteristic admittance and impedance matrices are defined (FIG. 2 at 206):

$$Y_0 = Z_0^{-1} = P Y_D^{1/2} Z_D^{-1/2} P^T$$

The characteristic impedance matrix represents the ideal, "reflection free" termination for the set of coupled transmission lines. A useful property of the characteristic impedance matrix that is utilized below:

$$Y_0 Z Y_0 = (P Y_D^{1/2} Z_D^{-1/2} P^T) Z (P Y_D^{1/2} Z_D^{-1/2} P^T)$$

$$= (P Y_D^{1/2} Z_D^{-1/2})(P^T Z P)(Y_D^{1/2} Z_D^{-1/2} P^T)$$

$$= (P Y_D^{1/2} Z_D^{-1/2}) Z_D (Y_D^{1/2} Z_D^{-1/2} P^T)$$

$$= P Y_D P^T$$

$$= Y$$

The telegrapher equations are $$\frac{\partial v}{\partial x} + Zi = 0$$

$$\frac{\partial i}{\partial x} + Yv = 0$$

These equations can be linearly combined by adding and subtracting $Y_0$ times the first row from the second row:

$$\left(\frac{\partial i}{\partial x} - Y_0 \frac{\partial v}{\partial x}\right) + Yv - Y_0 Zi = 0$$

$$\left(\frac{\partial i}{\partial x} + Y_0 \frac{\partial v}{\partial x}\right) + Yv + Y_0 Zi = 0$$

Replacing $Y$ by $Y_0 Z Y_0$ (the "useful property" mentioned above) and rearranging the equations results in $$\frac{\partial}{\partial x}(i - Y_0 v) - Y_0 Z(i - Y_0 v) = 0$$

$$\frac{\partial}{\partial x}(i + Y_0 v) + Y_0 Z(i + Y_0 v) = 0$$

$$\frac{\partial}{\partial x}(i - Y_0 v) - Y_0 Z(i - Y_0 v) = 0$$

$$\frac{\partial}{\partial x}(i + Y_0 v) + Y_0 Z(i + Y_0 v) = 0$$

Further:

$$Y_0 Z = (P Y_D^{1/2} Z_D^{-1/2} P^T)(P^{-T} Z_D P^{-1})$$

$$= P Y_D^{1/2} Z_D^{1/2} P^{-1}$$

$$= P \Lambda P^{-1}$$

There are two decoupled systems of equations:

$$\frac{\partial}{\partial x}(i - Y_0 v) - P \Lambda P^{-1}(i - Y_0 v) = 0$$

$$\frac{\partial}{\partial x}(i + Y_0 v) + P \Lambda P^{-1}(i + Y_0 v) = 0$$

The solutions of these equations can be represented with matrix exponentials:

$$i(x) - Y_0 v(x) = P\exp(\Lambda x) P^{-1} [i(0) - Y_0 v(0)]$$

$$i(x) + Y_0 v(x) = P\exp(-\Lambda x) P^{-1} [i(0) + Y_0 v(0)]$$

These two equations represent a backward and forward traveling set of waves, respectively. For the backward traveling wave, it may be beneficial to write the solution in terms of the known voltages and currents at the far end of the line (x=l):

$$i(x) - Y_0 v(x) = P\exp[\Lambda(x-l)] P^{-1} [i(l) - Y_0 v(l)]$$

If attention is focused on the two ends of the transmission line (x=0 and x=l) then the following results:

$$i(0) - Y_0 v(0) = P\exp(-\Lambda l) P^{-1} [i(l) - Y_0 v(l)]$$

$$i(l) + Y_0 v(l) = P\exp(-\Lambda l) P^{-1} [i(0) + Y_0 v(0)]$$

This can be put this in a more symmetric form by using the port voltages and currents, defined by:

$$v_1 = v(0) \quad v_2 = v(l)$$

$$i_1 = i(0) \quad i_2 = -i(l)$$

This provides a final method-of-characteristics form:

$$i_1 - Y_0 v_1 = -P\exp(-\Lambda l) P^{-1} (i_2 + Y_0 v_2)$$

$$i_2 - Y_0 v_2 = -P\exp(-\Lambda l) P^{-1} (i_1 + Y_0 v_1)$$

or in block matrix form $$\begin{bmatrix} Y_0 v_1 - i_2 \\ Y_0 v_2 - i_2 \end{bmatrix} = \begin{bmatrix} 0 & P\exp(-\Lambda l) P^{-1} \\ P\exp(-\Lambda l) P^{-1} & 0 \end{bmatrix} \begin{bmatrix} Y_0 v_1 + i_1 \\ Y_0 v_2 + i_2 \end{bmatrix}$$

This set of equations is a scattering matrix representation for a 2N-port, where the reference admittance is a frequency-dependent matrix, $Y_0$. The zero diagonal blocks are an indication that the reference impedance is a perfect termination (producing no reflections). The off-diagonal blocks are similar to a frequency-domain delay operator (except that there are matrices instead of scalars, and the magnitude is not, in general, equal to one).

If the frequency is sufficiently high, the inductive and capacitive components of the Z and Y matrices (respectively) will dominate. Therefore, YZ will tend towards $s^2 CL$ in the high-frequency limit. Then, this results in the propagation matrix $P \exp(-\Lambda l) P^{-1}$ tending toward a pure delay operation, $P_\infty \exp(-sIT) P_\infty^{-1}$ where $$(CL)P_\infty = P_\infty T^2$$

is the eigenvalue decomposition of CL.

This pure delay is, in some implementations problematic for state-space approximations. If desired, this can be extracted from the propagation matrix and simulated separately (e.g. with a set of N delay queues):

$$P\exp(-\Lambda l) P^{-1} = \Theta(s)[P_\infty \exp(-sIT) P_\infty^{-1}]$$

where $$\Theta(s) = P\exp(-\Lambda l) P^{-1} [P_\infty \exp(-sIT) P_\infty^{-1}]^{-1}$$

$$= P\exp(-\Lambda l) P^{-1} \cdot P_\infty \exp(sIT) P_\infty^{-1}$$

Only the delay-free function $\Theta(s)$ is then fit with a state-space system. Using this technique, it is possible to use fewer states to achieve an accurate fit (FIG. 2 at 204, 206).

Thus, the method depicted in FIG. 2 determines a physical characteristic by doing one or more of:
1. Do state-space fits to the matrix functions $Y_0(s)$ and $\Theta(s)$.
2. Form the incident wave quantities $i_1 + Y_0(s) v_1$ and $i_2 + Y_0(s) v_2$ for the current time step.
3. Apply the matrix $P_\infty^{-1}$ (notice that this is a frequency-independent matrix) to both of the above incident wave quantities.
4. Store the results into a set of delay queues whose time delays are the entries of the diagonal matrix T.

5. Retrieve the entries for the current time point from the delay queues and apply the frequency-independent matrix $P_\infty$.
6. Apply the propagation matrix $\Theta(s)$ to the results of step 5.
7. Use the result of 6 as independent current sources in the equations $i_1 - Y_0(s)v_1 = F_2$, $i_2 - Y_0(s)v_2 = F_1$. Solve the complete system of circuit equations to obtain the port voltages and currents at the current time point.
8. Go back to 2 and repeat until the simulation is finished. (FIG. 2 at 208, 210.)

The process described with reference to FIG. 2 can be sub-optimal in some instances, in that signal integrity transient simulation of lossy transmission lines looks to determine the final value of the output of a line after a transition at the input. In the usual case of no zero-frequency conductance (dielectrics lossless at DC), it is expected that, after all the reflections have settled, the line should behave as a resistor of value Rl, where R is the per-unit-length resistance of the line, and l the length of the line.

In the FIG. 2 formulation for transient simulation, this limit comes about due to a delicate cancellation between the two state space systems, $Y_0(s)$ and $\Theta(s)$. This is true in general, but can be illustrated in the single line case. For the case where G=0, and limiting to the single line case, P=1, the system simplifies to:

$$Y_0(s) = \sqrt{Cs/(R+Ls)},$$

$$\Lambda(s) = \sqrt{Cs(R+Ls)}, \text{ and}$$

$$\Theta(s) = \exp[(-\sqrt{Cs(R+Ls)} + s\sqrt{CL})l].$$

The equations $$Y_0(s)v_1 - i_1 = \Theta(s)\exp(-slT)[Y_0(s)v_2 + i_2]$$

$$Y_0(s)v_2 - i_2 = \Theta(s)\exp(-slT)[Y_0(s)v_1 + i_1]$$

illustrate that in the limit as frequency goes to zero, these equations become duplicates of each other, both enforcing that $i_1 = -i_2$. This is because $Y_0$ goes to zero as s goes to zero, and both $\Theta(s)$ and $\exp(-sT)$ go to unity as s goes to zero.

In order to get two independent equations out of these as s goes to zero, the Taylor series expansion of $Y_0$ and $\Theta$ in powers of $\sqrt{s}$ ($\exp(-slT) = 1$ to first order in $\sqrt{s}$) is taken:

$$Y_0(s) \sim \sqrt{s}\sqrt{C/R}$$

$$\Theta(s) \sim 1 - \sqrt{s}\sqrt{RCl}$$

This gives $$\sqrt{s}\sqrt{C/R}v_1 - i_1 = (1 - \sqrt{s}\sqrt{RCl})[\sqrt{s}\sqrt{C/R}v_2 + i_2]$$

$$\sqrt{s}\sqrt{C/R}v_2 - i_2 = (1 - \sqrt{s}\sqrt{RCl})[\sqrt{s}\sqrt{C/R}v_1 + i_1]$$

leading to $$\sqrt{s}\sqrt{C/R}v_1 - i_1 = i_2 - \sqrt{s}\sqrt{RCl}i_2 + \sqrt{s}\sqrt{C/R}v_2$$

$$\sqrt{s}\sqrt{C/R}v_2 - i_2 = i_1 - \sqrt{s}\sqrt{RCl}i_1 + \sqrt{s}\sqrt{C/R}v_1$$

The terms on the order of unity lead to $i_1 = -i_2$, as mentioned above. The terms that go as $\sqrt{s}$ in the first equation give $$\sqrt{RCl}i_2 = \sqrt{C/R}(v_2 - v_1)$$

and when multiplied through by $\sqrt{R/C}$ give the expected $$Rli_2 = v_2 - v_1$$

(The second equation gives the same result, with the assumption that $i_1 = -i_2$.)

This indicates that in order to get the lossy transmission line model to behave correctly in transient at large values of time (corresponding to small values of frequency), the models for the two frequency-dependent parameters, $Y_0$ and $\Theta$, need to be precise in their Taylor series expansions to first order in $\sqrt{s}$. This is difficult to ensure with general state-space fitting algorithms, so an alternate approach is described herein.

Figure 3:
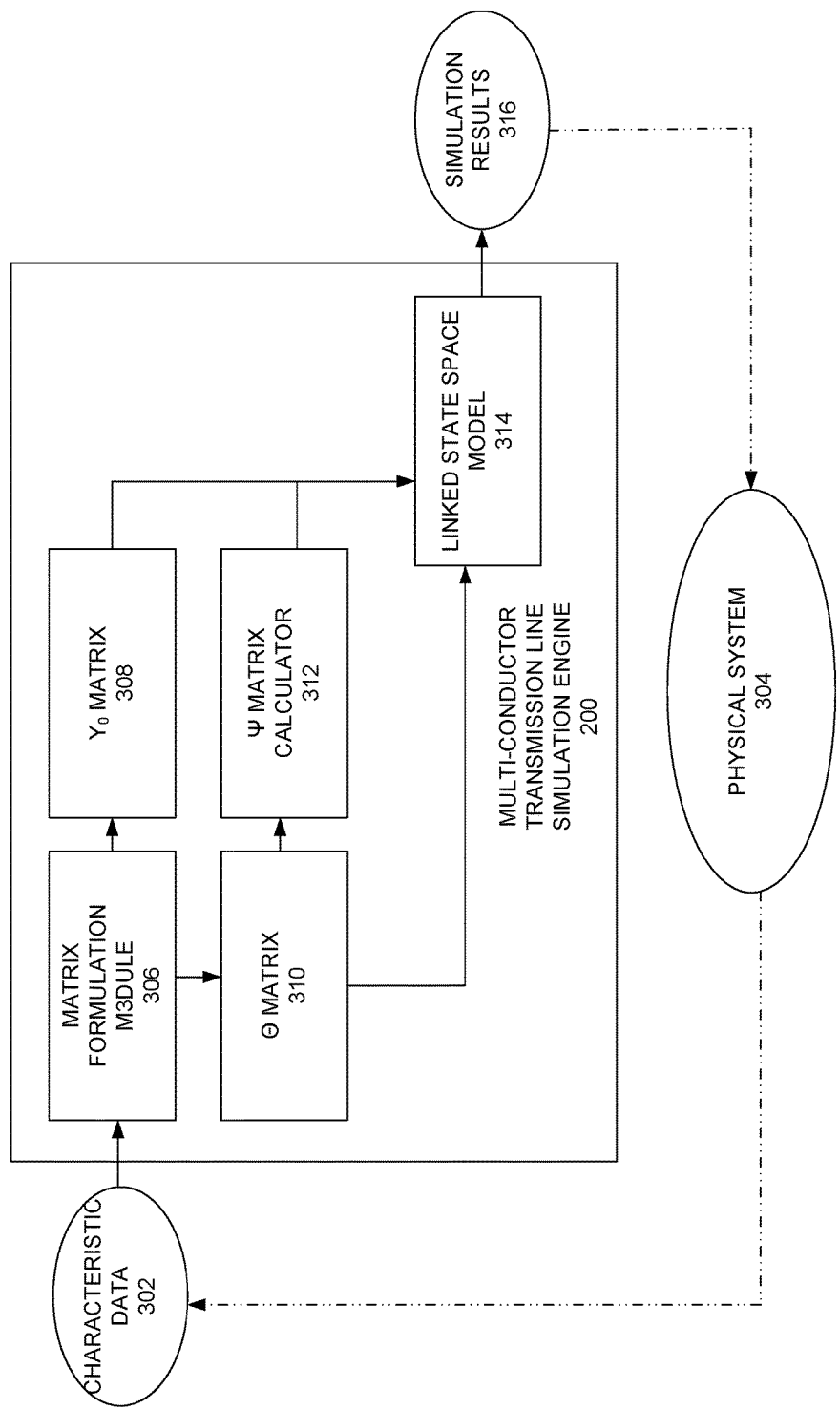
FIG. 3 is a diagram depicting a processor implemented method of constructing a physical transmission line system.

FIG. 3 is a diagram depicting a processor implemented method of constructing a physical transmission line system. Characteristic data 302 associated with a transmission line system 304 is received. A model of the transmission line system 304 is built based on the characteristic data. Building a model of the transmission line system 304 includes using a matrix formulation module 306 to determine a characteristic admittance matrix 308 based on the characteristic data 302, determining a propagation function matrix 310 based on the characteristic data 302, calculating a linking matrix 312 based on the characteristic admittance matrix 308 and the propagation function matrix 310, and determining a state space model 314 based on the characteristic admittance matrix 308 and the linking matrix 312. A simulation is performed using the state space model 314 to determine a physical characteristic as simulation results 316, where the transmission line system 304 is built or modified based on the simulation-determined physical characteristic 316.

Figure 4:
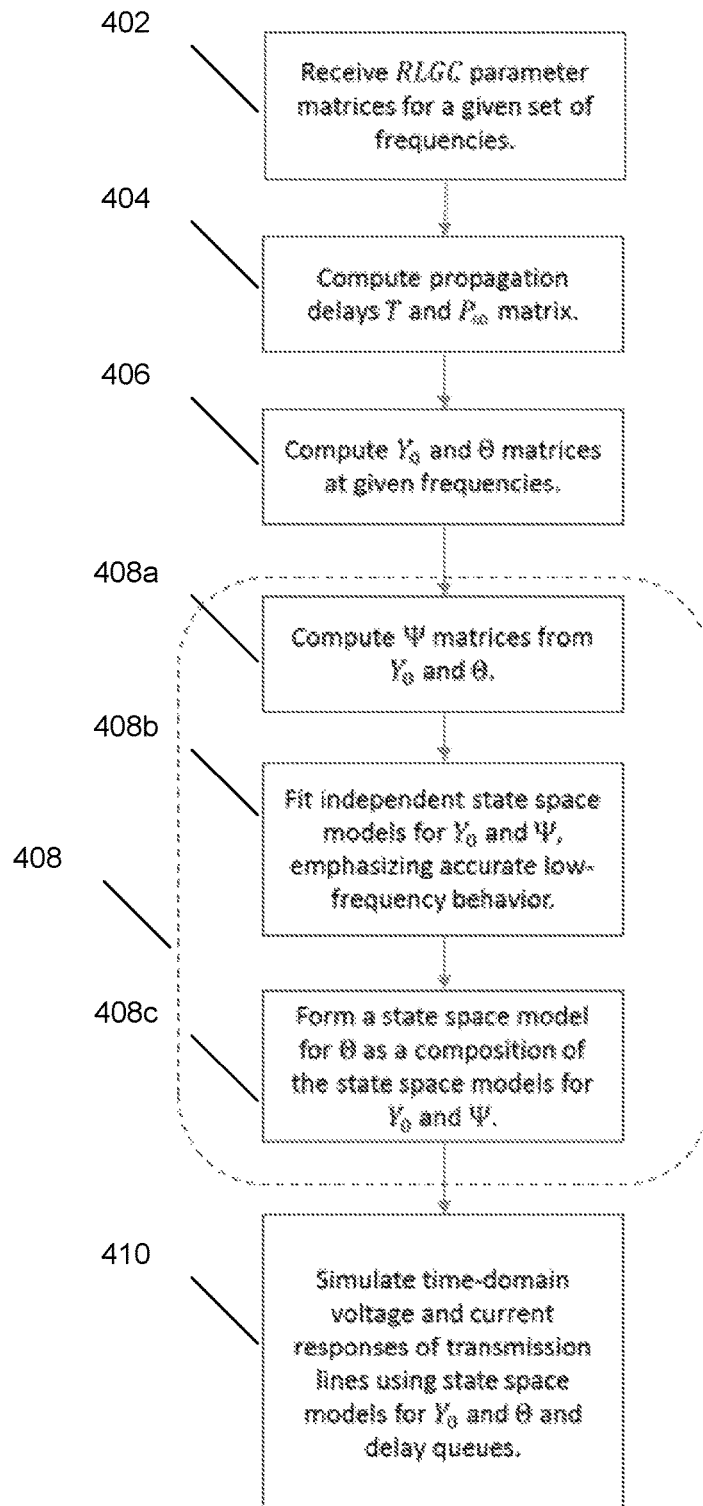
FIG. 4 is a flow diagram depicting a processor-implemented method of constructing a physical transmission line system that highlights example differences from the method of FIG. 2.

FIG. 4 is a flow diagram depicting a processor-implemented method of constructing a physical transmission line system that highlights example differences from the method of FIG. 2. Where the method of FIG. 2 fit independent state space models for $Y_0$ and $\Theta$ at 208, the example of FIG. 4 links the two models using the linking $\Psi$ matrix at 408. Rather than generating state space models for $Y_0$ and $\Theta$, models are generated for $Y_0$ and $\Psi$ as a new variable.

The characteristic equations in matrix form are $$Y_0 v_1 - i_1 = \Theta(s)\exp(-sT)[Y_0 v_2 + i_2]$$

$$Y_0 v_2 - i_2 = \Theta(s)\exp(-sT)[Y_0 v_1 + i_1]$$

Expanding to first order as series in the variable $\sqrt{s}$ about $\sqrt{s} = 0$ yields $$Y_0(s) = Y_1\sqrt{s} + \ldots$$

$$\Theta(s) = I + \Theta_1\sqrt{s} + \ldots$$

$$\exp(-sT) = I + 0 - T(\sqrt{s})^2 + \ldots$$

where I is the identity matrix. Using these expansions in the characteristic equations gives $$Y_1\sqrt{s} \cdot v_1 - i_1 = (I + \Theta_1\sqrt{s})[Y_1\sqrt{s} \cdot v_2 + i_2] + \ldots$$

$$Y_1\sqrt{s} \cdot v_2 - i_2 = (I + \Theta_1\sqrt{s})[Y_1\sqrt{s} \cdot v_1 + i_1] + \ldots$$

As shown for the scalar case, matching the terms of order unity gives $$i_1 = i_2$$

Matching the terms of order $\sqrt{s}$ yields $$Y_1(v_1 - v_2) = -\Theta_1 i_1$$

This equation produces the proper low frequency behavior. To ensure that this is maintained, select $$\Psi = Y_0^{-1}(I - \Theta)$$

Because both $Y_0$ and $I - \Theta$ behave as $\sqrt{s}$ in the low frequency limit, these $\sqrt{s}$ terms will cancel out in $\Psi$, causing it to approach a constant value at low frequency. Thus, the series expansion of $\Psi$ has the form $\Psi(s) = \Psi_0 + \Psi_1\sqrt{s} + \ldots$ Rearranging the equation for $\Psi$ as $Y_0\Psi=I-\Theta$ and expanding as a series to $0^{th}$ order yields $$Y_1\Psi_0 = -\Theta_1$$

Therefore if $Y_1$ and $\Psi_0$ can be accurately reproduced by their respective state space models, the value of $\Theta_1$ will be reproduced in a state space model derived from them. This in turn ensures that the critical low frequency condition shown above will be satisfied. The value $\Psi_0$ is simply the DC limit of $\Psi$ and so this can be easily enforced in a state space fitter. It is also the case that $\Psi$, being the product of two causal functions ($Y_0^{-1}$ is the characteristic impedance of the lines, and the identity matrix is causal as well) is a causal function that can be fit without difficulties by a stable state-space system. The value $Y_1$ can be enforced by weighting the state-space fitter to get a high accuracy match to the low-frequency values while creating the state space model for $Y_0$. Thus the overall low frequency behavior of the transmission line model is improved.

The state-space model for $\Theta$ is derived by composing the state-space models for $Y_0$ and $\Psi$. Denoting the state space model for $Y_0$ as $$A_Y, B_Y, C_Y, D_Y$$

and that for $\Psi$ as $$A_\Psi, B_\Psi, C_\Psi, D_\Psi$$

Then the derived state-space model for $\Theta$ is:

$$A_\Theta = \begin{bmatrix} A_\Psi & 0 \\ B_Y C_\Psi & A_Y \end{bmatrix}$$

$$B_\Theta = \begin{bmatrix} B_\Psi \\ B_Y D_\Psi \end{bmatrix}$$

$$C_\Theta = -[D_Y C_\Psi \quad C_Y]$$

$$D_\Theta = I - D_Y D_\Psi$$

In some instances, the state-space model for $\Theta$ is larger when calculated this way than if it were fit directly, but the relationship between $Y_0$ and $\Theta$ ensure that low-frequency resistance accuracy is maintained.

Figure 5:
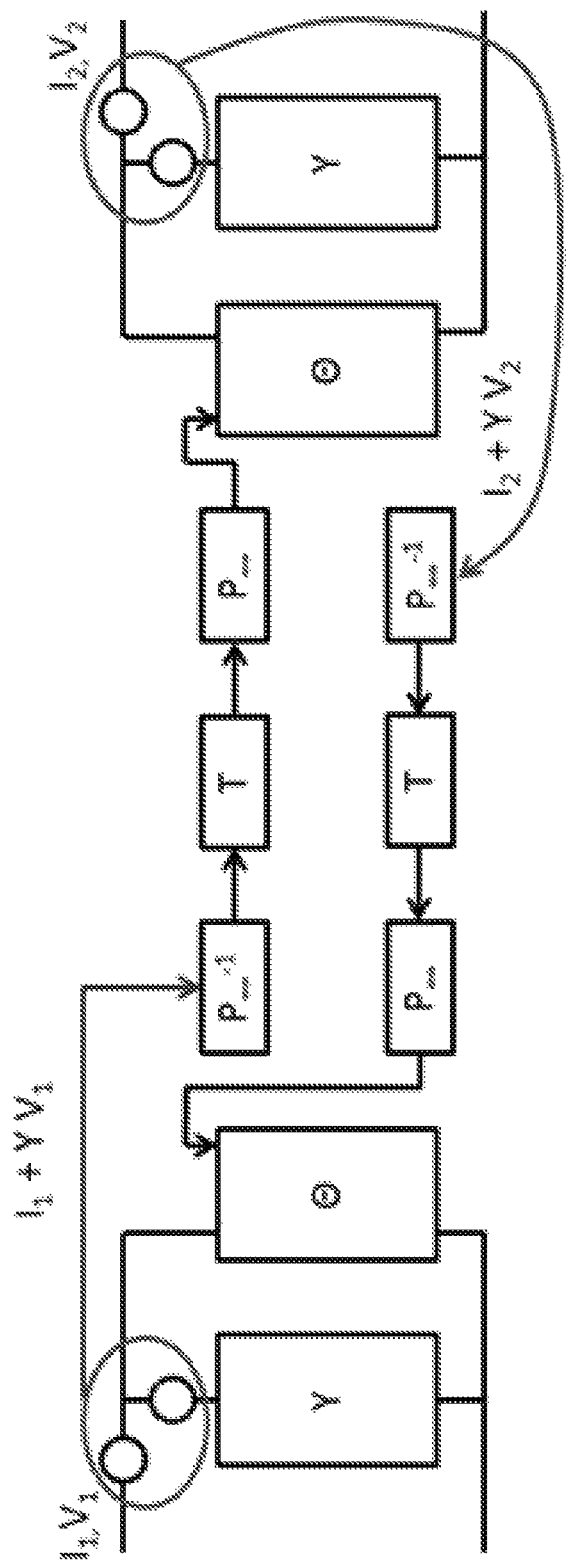
FIG. 5 is a block diagram depicting an example data flow of a system for modeling, simulating, and building a physical transmission line system.

FIG. 5 is a block diagram depicting an example data flow of a system for modeling, simulating, and building a physical transmission line system. The equations being solved are the following (in the frequency domain)

$$\begin{bmatrix} Y_0(s)v_1 - i_1 \\ Y_0(s)v_2 - i_2 \end{bmatrix} = \begin{bmatrix} 0 & \Theta(s)P_\infty\exp(-slT)P_\infty^{-1} \\ \Theta(s)P_\infty\exp(-slT)P_\infty^{-1} & 0 \end{bmatrix} \begin{bmatrix} Y_0(s)v_1 + i_1 \\ Y_0(s)v_2 + i_2 \end{bmatrix}$$

With the present invention state-space systems to handle the transient evolution of $Y_0(s)$ and $\Theta(s)$, implementation of these equations in the time-domain can be represented by the block diagram depicted in FIG. 5.

The presently described systems and methods for simulation provide quality transient simulation of lossy multi-conductor transmission lines, with particular emphasis on one of the aspects of simulation most important to signal integrity uses: accurate long-time behavior by having the correct low-frequency limit of the ratio of $Y_0(s)$ to $\Theta(s)$. U.S. Pat. No. 8,504,345 related to State-space model-based simulators and methods is incorporated herein by reference in its entirety.

Figure 6A:
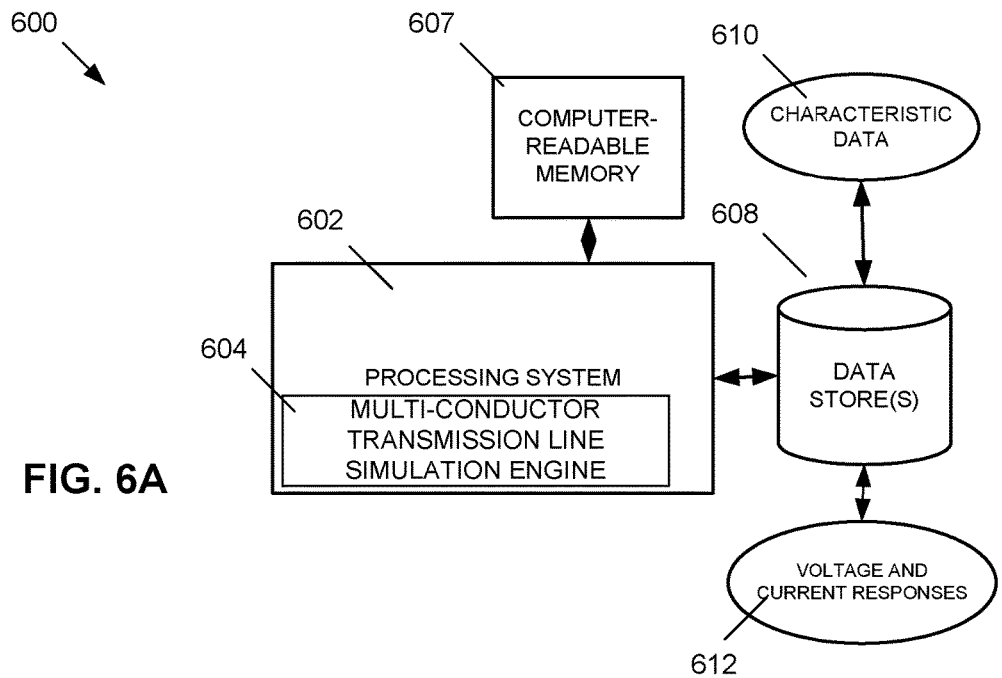
FIGS. 6A, 6B, and 6C depict example systems for implementing the approaches described herein for implementing a computer-implemented multi-conductor transmission line simulation engine.
Figure 6B:
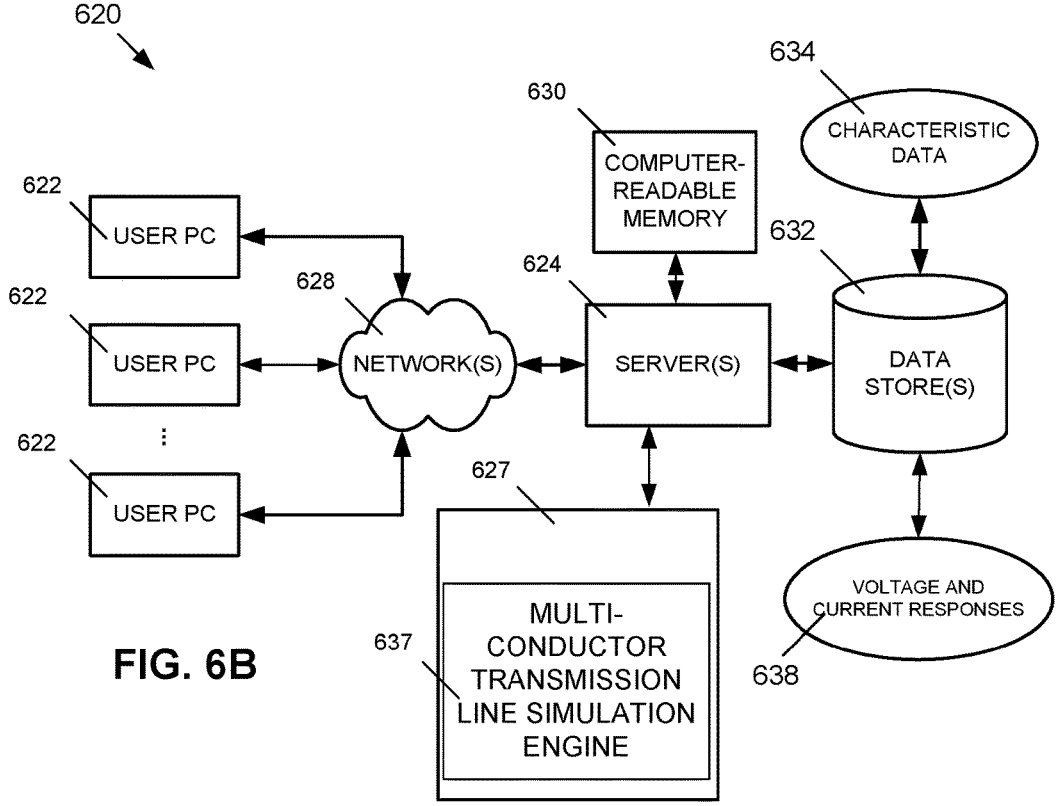
Figure 6C:
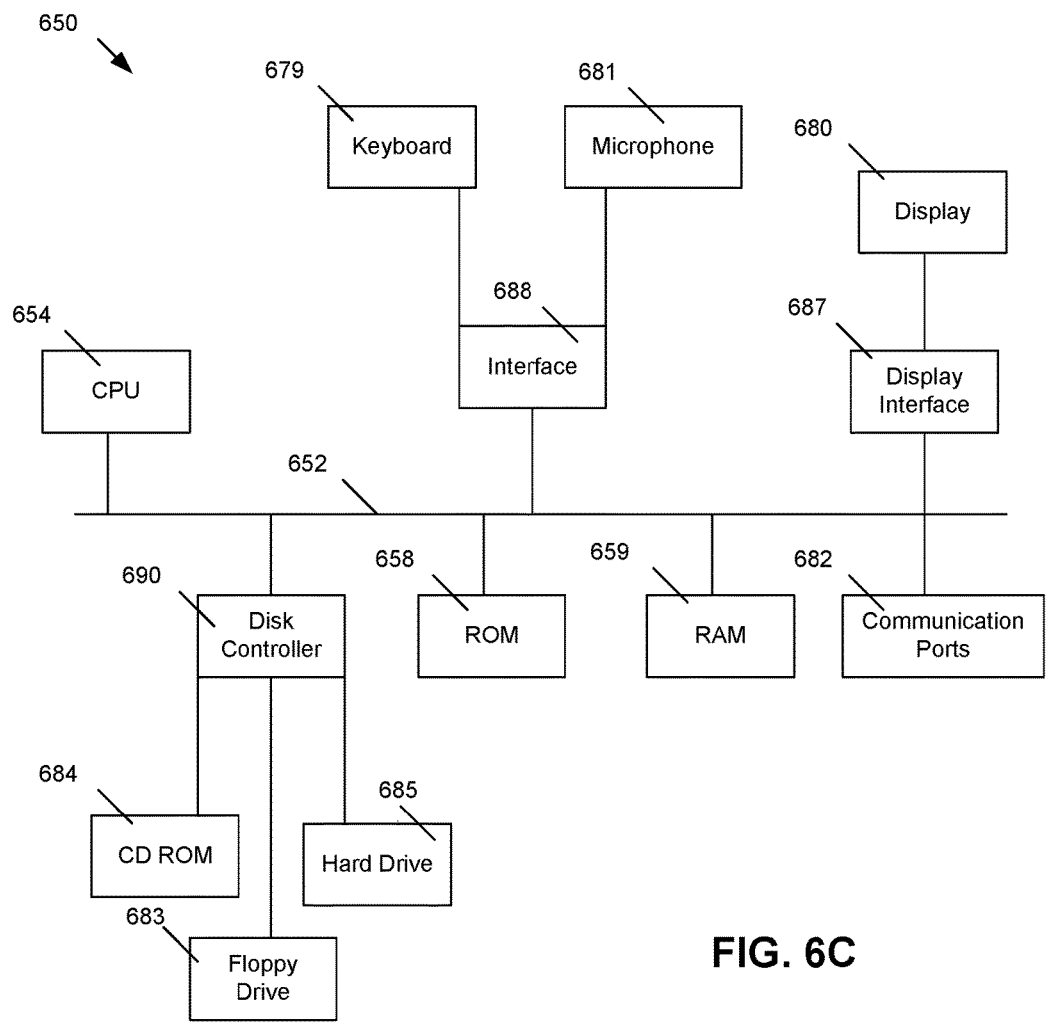

FIGS. 6A, 6B, and 6C depict example systems for implementing the approaches described herein for implementing a computer-implemented multi-conductor transmission line simulation engine. For example, FIG. 6A depicts an exemplary system 600 that includes a standalone computer architecture where a processing system 602 (e.g., one or more computer processors located in a given computer or in multiple computers that may be separate and distinct from one another) includes a computer-implemented multi-conductor transmission line simulation engine 604 being executed on the processing system 602. The processing system 602 has access to a computer-readable memory 607 in addition to one or more data stores 608. The one or more data stores 608 may include characteristic data 610 as well as voltage and current responses 612. The processing system 602 may be a distributed parallel computing environment, which may be used to handle very large-scale data sets.

FIG. 6B depicts a system 620 that includes a client-server architecture. One or more user PCs 622 access one or more servers 624 running a computer-implemented time domain decomposition solver engine 637 on a processing system 627 via one or more networks 628. The one or more servers 624 may access a computer-readable memory 630 as well as one or more data stores 632. The one or more data stores 632 may include characteristic data 634 as well as voltage and current responses 638.

FIG. 6C shows a block diagram of exemplary hardware for a standalone computer architecture 650, such as the architecture depicted in FIG. 6A that may be used to include and/or implement the program instructions of system embodiments of the present disclosure. A bus 652 may serve as the information highway interconnecting the other illustrated components of the hardware. A processing system 654 labeled CPU (central processing unit) (e.g., one or more computer processors at a given computer or at multiple computers), may perform calculations and logic operations required to execute a program. A non-transitory processor-readable storage medium, such as read only memory (ROM) 658 and random access memory (RAM) 659, may be in communication with the processing system 654 and may include one or more programming instructions for performing the method of implementing a computer-implemented multi-conductor transmission line simulation engine. Optionally, program instructions may be stored on a non-transitory computer-readable storage medium such as a magnetic disk, optical disk, recordable memory device, flash memory, or other physical storage medium.

In FIGS. 6A, 6B, and 6C, computer readable memories 608, 630, 658, 659 or data stores 608, 632, 683, 684, 688 may include one or more data structures for storing and associating various data used in the example systems for implementing a computer-implemented multi-conductor transmission line simulation engine. For example, a data structure stored in any of the aforementioned locations may be used to store data from XML files, initial parameters, and/or data for other variables described herein. A disk controller 690 interfaces one or more optional disk drives to the system bus 652. These disk drives may be external or internal floppy disk drives such as 683, external or internal CD-ROM, CD-R, CD-RW or DVD drives such as 684, or external or internal hard drives 685. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 690, the ROM 658 and/or the RAM 659. The processor 654 may access one or more components as required.

A display interface 687 may permit information from the bus 652 to be displayed on a display 680 in audio, graphic, or alphanumeric format. Communication with external devices may optionally occur using various communication ports 682.

In addition to these computer-type components, the hardware may also include data input devices, such as a keyboard 679, or other input device 681, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It is claimed:

1. A processor-implemented method of constructing a physical transmission line system, comprising:
   receiving characteristic data associated with a physical transmission line system;
   building a model of the physical transmission line system based on the characteristic data, wherein building a model of the physical transmission line system comprises:
   determining a characteristic admittance matrix based on the characteristic data;
   determining a propagation function matrix based on the characteristic data;
   calculating a linking matrix based on the characteristic admittance matrix and the propagation function matrix;
   determining a state space model based on the characteristic admittance matrix and the linking matrix;
   performing a simulation using the state space model to determine a physical characteristic;
   wherein the physical transmission line system is (i) built based on the simulation predicting the physical transmission line system will behave as desired or (ii) modified based on the simulation predicting the physical transmission line system will not behave as desired.

2. The method of claim 1, wherein the propagation function matrix represents delay, distortion, or attenuation in the physical transmission line system.

3. The method of claim 1, wherein the linking matrix is determined according to:

$$\Psi = Y^{-1}(I-\Theta),$$

where $\Psi$ is the linking matrix, $Y$ is the characteristic admittance matrix, and $\Theta$ is the propagation function matrix.

4. The method of claim 1, wherein the state space model is configured to simulate transmission of an impulse signal in a transmission line and a plurality of reflections in that transmission line.

5. The method of claim 4, wherein the state space model is configured to determine an effect of transmission of the impulse signal in the transmission line in a second transmission line.

6. The method of claim 5, wherein the transmission line and the second transmission line are in close proximity.

7. The method of claim 5, wherein the transmission line and the second transmission line are parallel transmission lines.

8. The method of claim 1, wherein the physical characteristic includes a constant voltage and current level associated with a steady state time after the plurality of reflections have dissipated.

9. The method of claim 1, wherein the physical characteristic is a time-domain voltage and current response of a transmission line to an impulse signal.

10. The method of claim 1, wherein a transmission line simulated by the state space model is a transmission line in a consumer electronics device.

11. The method of claim 10, wherein the consumer electronics device is a mobile computing device or a mobile fitness device.

12. A processor-implemented system for constructing a physical transmission line system, comprising:
   one or more data processors;
   a computer-readable medium encoded with instructions for commanding the one or more data processors to execute steps of a method, comprising:
   receiving characteristic data associated with a physical transmission line system;
   building a model of the physical transmission line system based on the characteristic data, wherein building a model of the physical transmission line system comprises:

determining a characteristic admittance matrix based on the characteristic data;
determining a propagation function matrix based on the characteristic data;
calculating a linking matrix based on the characteristic admittance matrix and the propagation function matrix;
determining a state space model based on the characteristic admittance matrix and the linking matrix;
performing a simulation using the state space model to determine a physical characteristic;
wherein the physical transmission line system is (i) built based on the simulation predicting the physical transmission line system will behave as desired or (ii) modified based on the simulation predicting the physical transmission line system will not behave as desired.

13. The system of claim 12, wherein the propagation function matrix represents delay, distortion, or attenuation in the physical transmission line system.

14. The system of claim 12, wherein the linking matrix is determined according to:

$$\Psi = Y^{-1}(I-\Theta),$$

where $\Psi$ is the linking matrix, Y is the characteristic admittance matrix, and $\Theta$ is the propagation function matrix.

15. The system of claim 12, wherein the state space model is configured to simulate transmission of an impulse signal in a transmission line and a plurality of reflections in that transmission line.

16. The system of claim 15, wherein the state space model is configured to determine an effect of transmission of the impulse signal in the transmission line in a second transmission line.

17. The system of claim 16, wherein the transmission line and the second transmission line are in close proximity.

18. The system of claim 16, wherein the transmission line and the second transmission line are parallel transmission lines.

19. The system of claim 12, wherein the physical characteristic includes a constant voltage and current level associated with a steady state time after the plurality of reflections have dissipated.

20. A non-transitory computer-readable medium encoded with instructions for commanding a processing system to execute steps of a method for constructing a physical transmission line system, the method comprising:
receiving characteristic data associated with a physical transmission line system;
building a model of the physical transmission line system based on the characteristic data, wherein building a model of the physical transmission line system comprises:
determining a characteristic admittance matrix based on the characteristic data;
determining a propagation function matrix based on the characteristic data;
calculating a linking matrix based on the characteristic admittance matrix and the propagation function matrix;
determining a state space model based on the characteristic admittance matrix and the linking matrix;
performing a simulation using the state space model to determine a physical characteristic;
wherein the physical transmission line system is (i) built based on the simulation predicting the physical transmission line system will behave as desired or (ii) modified based on the simulation predicting the physical transmission line system will not behave as desired.

* * * * *